(12) United States Patent
Tanaka

(10) Patent No.: US 9,208,149 B2
(45) Date of Patent: Dec. 8, 2015

(54) MACHINE TRANSLATION APPARATUS, METHOD AND PROGRAM

(71) Applicant: KABUSHIKI KAISHA TOSHIBA, Minato-ku, Tokyo (JP)

(72) Inventor: Hiroyuki Tanaka, Fujisawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 248 days.

(21) Appl. No.: 14/048,274

(22) Filed: Oct. 8, 2013

(65) Prior Publication Data

US 2014/0100843 A1  Apr. 10, 2014

(30) Foreign Application Priority Data

Oct. 10, 2012 (JP) ................................. 2012-225387

(51) Int. Cl.
*G06F 17/28* (2006.01)

(52) U.S. Cl.
CPC .......... *G06F 17/289* (2013.01); *G06F 17/2854* (2013.01)

(58) Field of Classification Search
CPC ... G06F 17/27; G06F 17/2705; G06F 17/271; G06F 17/2785; G06F 17/28; G06F 17/2809; G06F 17/2818; G06F 17/2854; G06F 17/2872; G06F 17/2811; G06F 17/289

USPC ........................................ 704/2, 3, 4, 5, 7, 10
See application file for complete search history.

(56) References Cited

U.S. PATENT DOCUMENTS

| | | | |
|---|---|---|---|
| 5,321,607 A * | 6/1994 | Fukumochi et al. | 704/4 |
| 8,185,377 B2 * | 5/2012 | Zhou | 704/9 |
| 2002/0198701 A1 * | 12/2002 | Moore | 704/2 |
| 2004/0254781 A1 * | 12/2004 | Appleby | 704/2 |
| 2011/0093254 A1 * | 4/2011 | Kuhn et al. | 704/2 |
| 2013/0132064 A1 * | 5/2013 | Hwang et al. | 704/2 |

FOREIGN PATENT DOCUMENTS

JP      2002-351872 A      12/2002

* cited by examiner

*Primary Examiner* — Qi Han
(74) *Attorney, Agent, or Firm* — Ohlandt, Greeley, Ruggiero & Perle, L.L.P.

(57) ABSTRACT

According to one embodiment, a machine translation apparatus includes a translation unit, an acquisition unit, a first calculation unit, a reverse translation unit, a second calculation unit and a selection unit. The acquisition unit acquires, at least one second forward-translated word different from the first forward-translated word, to obtain candidate words. The reverse translation unit obtains at least one reverse-translated word for each of the candidate words by reverse-translating each candidate word into the first language. The selection unit selects a corrected forward-translated word to be replaced with the first forward-translated word from among the candidate words based on the semantic similarity and fluency.

15 Claims, 10 Drawing Sheets

FIG. 1

| Original words | Forward-translated words |
|---|---|
| suggest | 示唆して (shisashite) |
| | 提案して (teiannshite) |
| | 勧めて (susumete) |
| | 暗示して (annjishite) |
| | ⋮ |
| ⋮ | ⋮ |

FIG. 2

| Preceding words | Subsequent words | Forward-translated words | Fluency |
|---|---|---|---|
| レストランを (resutorann wo) | もらえ (morae) | 探して (sagashite) | 0.84 |
| | | 教えて (oshiete) | 0.83 |
| | | 経営して (keieishite) | 0.64 |
| | | 勧めて (susumete) | 0.30 |
| | | 提案して (teiannshite) | 0.21 |
| | | 示唆して (shisashite) | 0.13 |
| | | ⋮ | ⋮ |
| 名前を (namae wo) | もらえ (morae) | 覚えて (oboete) | 0.82 |
| | | 呼んで (yonnde) | 0.63 |
| | | 教えて (oshiete) | 0.52 |
| | | 入れて (irete) | 0.16 |
| | | つけて (tukete) | 0.14 |
| | | ⋮ | ⋮ |
| | | ⋮ | ⋮ |
| ⋮ | ⋮ | ⋮ | ⋮ |

Could you suggest a restaurant with a nice view?

F I G. 6

良い／眺めの／レストランを／示唆して／もらえませんか／？
*(yoi nagame no resutorann wo shisashite moraemasennka?)*

| Original words | Candidate words |
|---|---|
| suggest | 示唆して (shisashite) |
| | 提案して (teiannshite) |
| | 勧めて (susumete) |

FIG. 9

| Candidate words | Fluency |
|---|---|
| 示唆して (shisashite) | 0.13 |
| 提案して (teiannshite) | 0.21 |
| 勧めて (susumete) | 0.30 |

FIG. 10

| Candidate words | Reverse-translated words |
|---|---|
| 示唆して (shisashite) | indicate |
| | suggest |
| | hint |
| 提案して (teiannshite) | propose |
| | offer |
| | vote |
| 勧めて (susumete) | recommend |
| | advise |
| | urge |

| Candidate words | Reverse-translated words | Similarities |
|---|---|---|
| 示唆して (shisashite) | indicate | 0.43 |
| | suggest | 1.0 |
| | hint | 0.41 |
| 提案して (teiannshite) | propose | 0.74 |
| | offer | 0.64 |
| | vote | 0.21 |
| 勧めて (susumete) | recommend | 0.77 |
| | advise | 0.52 |
| | urge | 0.23 |

FIG. 11

| Candidate words | Reverse-translated words | Scores |
|---|---|---|
| 示唆して (shisashite) | indicate | 0.06 |
| | suggest | 0.13 |
| | hint | 0.05 |
| 提案して (teiannshite) | propose | 0.16 |
| | offer | 0.13 |
| | vote | 0.04 |
| 勧めて (susumete) | recommend | 0.23 |
| | advise | 0.16 |
| | urge | 0.07 |

| Candidate words | Fluency |
|---|---|
| 示唆して (shisashite) | 0.13 |
| 提案して (teiannshite) | 0.21 |
| 勧めて (susumete) | 0.30 |
| 探して (sagashite) | 0.84 |
| 教えて (oshiete) | 0.73 |
| 経営して (keieishite) | 0.64 |

FIG. 15

| Candidate words | Reverse-translated words |
|---|---|
| 示唆して (shisashite) | indicate |
| | suggest |
| | hint |
| 提案して (teiannshite) | propose |
| | offer |
| | vote |
| 勧めて (susumete) | recommend |
| | advise |
| | urge |
| 探して (sagashite) | seek |
| | search |
| | look for |
| 教えて (oshiete) | tell |
| | teach |
| | educate |
| 経営して (keieishite) | manage |
| | operate |
| | |

…
MACHINE TRANSLATION APPARATUS, METHOD AND PROGRAM

CROSS-REFERENCE TO RELATED APPLICATIONS

This application is based upon and claims the benefit of priority from Japanese Patent Application No. 2012-225387, filed Oct. 10, 2012, the entire contents of which are incorporated herein by reference.

FIELD

Embodiments described herein relate generally to a machine translation apparatus, method and program.

BACKGROUND

As a result of continued improvement in the performance of computers and the rapid growth of broadband infrastructure, various machine translation devices and services for translating a first language (original text) to a second language (translated text) have become popular. General machine translation has multiple translation candidates of the second language for a word or a clause in the first language. In such a system, a suitable translation for an input first language should be selected in terms of accuracy and fluency. A statistically-based translation system can be used to select a suitable translation; however, a massive bilingual corpus is necessary for such a system. To avoid this, cooccurrence words of the first and second languages can be used in considering accuracy.

DETAILED DESCRIPTION

The aforementioned method therefore requires cooccurrence word lists for both the original and translated texts; however, the fluency of the translated text cannot be considered on the basis of cooccurrence. Thus, a translated word with high fluency cannot be selected.

In general, according to one embodiment, a machine translation apparatus includes a translation unit, an acquisition unit, a first calculation unit, a reverse translation unit, a second calculation unit and a selection unit. The translation unit is configured to translate an original sentence which is a character string of a first language into a forward-translated sentence which is a character string of a second language. The acquisition unit is configured to acquire, by translating an original word in the original sentence corresponding to a first forward-translated word in the forward-translated sentence, at least one second forward-translated word different from the first forward-translated word, to obtain candidate words including the first forward-translated word and the at least one second forward-translated word. The first calculation unit is configured to calculate a fluency for each of the candidate words, the fluency indicating naturalness of the forward-translated sentence if each of the candidate words is replaced with the first forward-translated word. The reverse translation unit is configured to obtain at least one reverse-translated word for each of the candidate words by reverse-translating each candidate word into the first language. The second calculation unit is configured to calculate a semantic similarity between the original word and each reverse-translated word. The selection unit is configured to select a corrected forward-translated word to be replaced with the first forward-translated word from among the candidate words based on the semantic similarity and fluency.

In the subsequent, the machine translation apparatus, method and program according to the present embodiments will be described in details with reference to the drawings. In the embodiments described below, elements specified by the same reference number carry out the same operation, and a repetitive description of such elements will be omitted.

In the present embodiment, it is assumed that the original sentence (first language) is in English, and the forward-translated sentence (second language) is in Japanese. However, the target languages are not limited to English and Japanese, and may be other languages. In the subsequent, translation from the second language to the first language is referred to as reverse translation.

First Embodiment

Figure 1:
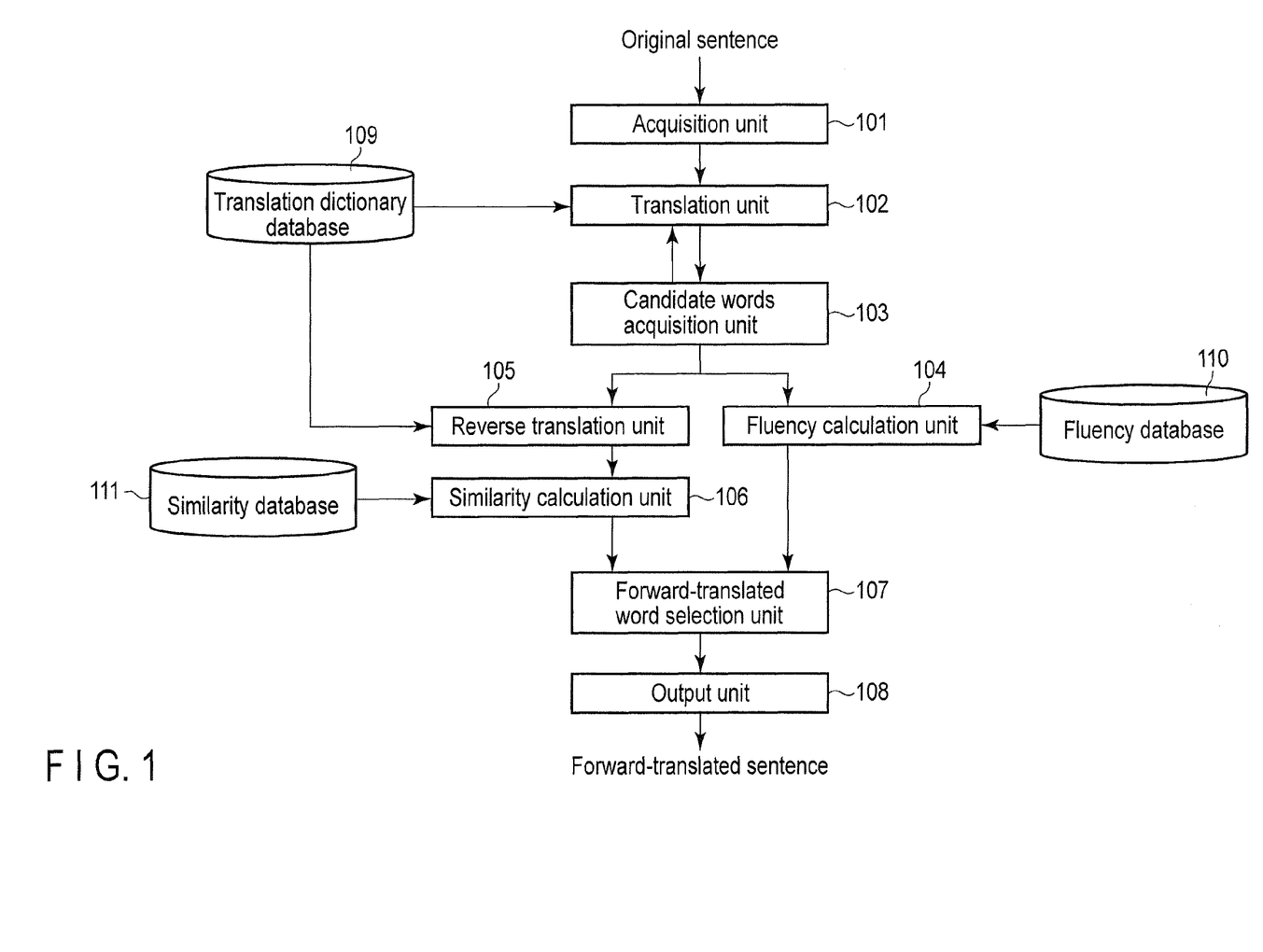
FIG. 1 is an exemplary block diagram illustrating a machine translation apparatus according to the first embodiment.

A description of the machine translation apparatus according to the first embodiment with reference to FIG. 1 follows.

A machine translation apparatus 100 according to the first embodiment includes an acquisition unit 101, a translation unit 102, a candidate word acquisition unit 103, a fluency calculation unit 104, a reverse translation unit 105, a similarity calculation unit 106, a forward-translated word selection unit 107, an output unit 108, a translation dictionary database0 109, a fluency database 110, and similarity database 111.

The acquisition unit 101 externally acquires an original sentence of the first language to be translated. The original sentence may be acquired by using generally used means for receiving a user input such as a keyboard, a pointing device, handwriting character recognition, OCR, and audio recognition. The original sentence may be externally acquired by means other than user input.

The translation unit 102 receives the original sentence from the acquisition unit 101, and obtains a forward-translated sentence by referring to a translation dictionary stored in the translation dictionary database 109 described below and translating the original sentence into the second language. The translation process may be carried out by using a general system such as a transfer system, an example-based system, a statistically-based system, and an inter-language system, and an explanation of the process is omitted.

The candidate word acquisition unit 103 receives the forward-translated sentence from the translation unit 102 and requests forward-translated words of a word of interest in the forward-translated sentence at the translation unit 102. Then, the candidate word acquisition unit 103 acquires one or more forward-translated words in the second language of a corresponding first language (original word) word that are different from the word of interest as candidate words. The word of interest is also included in the candidate words.

The fluency calculation unit 104 receives one or more candidate words from the candidate word acquisition unit 103, and calculates fluency for each candidate by referring to the fluency database 110 described below. The fluency indicates the degree of naturalness of the second language.

The fluency calculation unit 104 acquires a pre-calculated value from the fluency database 110 for calculation of the fluency according to the present embodiment. However, the fluency of a given word may be calculated by counting the frequency of a combination of the preceding and subsequent words and the given word and dividing the frequency by the total number. In addition, the fluency may be calculated by using a generally known method such as N-gram language model, Probabilistic Latent Semantic Analysis (PLSA) and Latent Dirichlet Allocation (LDA). Further, it is also possible to calculate the fluency every time a request for calculation is made by preparing an example corpus of the second language without pre-calculating the fluency.

The reverse translation unit 105 receives candidate words, the original sentence and the forward-translated sentence from the candidate acquisition unit 103. The reverse translation unit 105 reverse-translates each candidate word into the first language and obtains one or more reverse-translated words as a result of reverse translation. The reverse translation may be carried out by using a reverse translation dictionary, or using dictionary indices including a certain candidate word in the translated word list within the translation dictionary used at the translation unit 102. In addition, reverse translation results can be obtained by using an external translation engine to translate the second language into the first language, and added as reverse-translated words. The method for reverse translation is not limited thereof.

The similarity calculation unit 106 receives at least one reverse-translated word, the original word and the forward-translated sentence from the reverse translation unit 105, and calculates similarity in meaning between the original word and each reverse-translated word by referring to the similarity database 111 described later. The similarity may be calculated by calculating the cosine similarity, using a thesaurus, calculating context similarity, or clustering.

The forward-translated word selection unit 107 receives the candidate words, fluency for each candidate and the forward-translated sentence from the fluency calculation unit 104, and receives the reverse-translated words and the similarity for each reverse-translated word from the similarity calculation unit 106. The forward-translated word selection unit 107 calculates a score based on the fluency and similarity and selects a corrected forward-translated word to be replaced with the word of interest from among the candidate words. A forward-translated word having the highest score may be selected as the corrected forward-translated word, for example.

The output unit 108 receives the forward-translated sentence and the corrected forward-translated word from the forward-translated word selection unit 107, and externally outputs the corrected forward-translated sentence in which the word of interest has been replaced with the corrected forward-translated word. The output unit 108 may receive the forward-translated sentence from the translation unit 102 instead of the forward-translated word selection unit 107.

The translation dictionary database 109 stores a translation dictionary including words of the first language (original words) and the corresponding words of the second language (forward-translated words). The translation dictionary will be described with reference to FIG. 2 later.

The fluency database 110 stores any given words of the second language that may be inserted between two other words, the given words being associated with the fluency of the phrase in which each given word is inserted. The fluency database 110 will be described with reference to FIG. 3 later.

The similarity database 111 stores words of the first language and similarity with another word of the first language in association with each other.

The translation dictionary database 109, fluency database 110 and similarity database 111 may be included in the machine translation apparatus 100 or provided as external databases.

Next, an example of translation dictionary stored in the translation dictionary database 109 will be explained with reference to FIG. 2.

Figure 2:
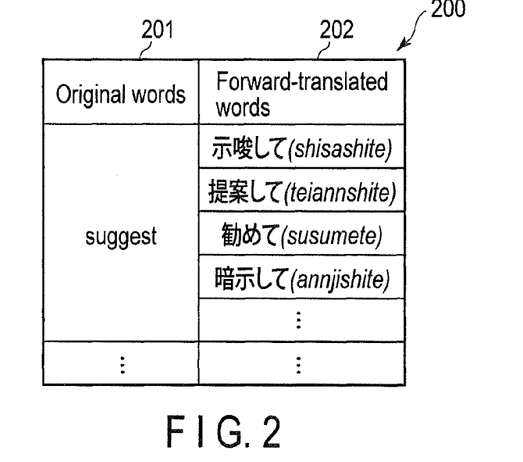
FIG. 2 illustrates an example of a table stored in a translation dictionary database.

The translation dictionary 200 shown in FIG. 2 stores original words 201 and associated forward-translated words 202. The original words 201 are words of the first language, and the forward-translated words 202 are forward-translated words in the second language which are conversions of the original words 201. Each original word is associated with at least one forward-translated words 202. For example, the original word 201, "suggest," is associated with the forward-translated words 202, "示唆して" (shisashite), "提案して" (teiannshite), "勧めて" (susumete) and "暗示して" (annjishite).

An example of table stored in the fluency database 110 will be explained with reference to FIG. 3.

Figure 3:
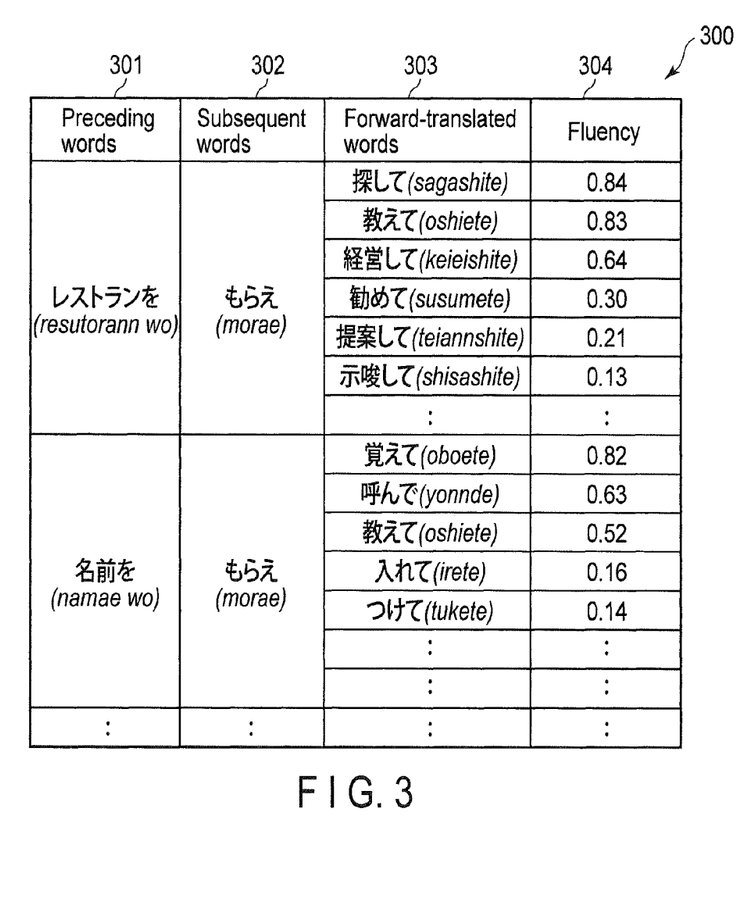
FIG. 3 illustrates an example of a table stored in a fluency database.

Table 300 shown in FIG. 3 stores preceding words 301, subsequent words 302, forward-translated words 303 and fluencies 304 that are associated with each other.

The preceding words 301 are words appear immediately before a word of interest, and the subsequent words 302 are words appear immediately after the word of interest. The forward-translated words 303 are words that may be inserted between the preceding words 301 and the subsequent words 302. The fluencies 304 each indicate the fluency of a forward-translated sentence in which a given forward-translated word 303 is inserted between a preceding word 301 and a subsequent word 303. Each of the fluencies 304 is associated with each of the forward-translated words 303.

Concretely, for a combination of a preceding word 301, "レストランを" (resutorann wo), and a subsequent word 302, "もらえ" (morae), forward-translated words 303, "探して" (sagashite), "教えて" (oshiete) "経営して" (keieishite) and the corresponding fluencies 304, 0.84, 0.73 and 0.64 are associated with each other. That is, the fluency of the forward-translated sentence, "レストランを教えてもらえ" (resutorann wo oshiete morae), is 0.73, and the fluency of the forward-translated sentence, "レストランを経営してもらえ" (resutorann wo keieishite morae) is 0.64.

Figure 4:
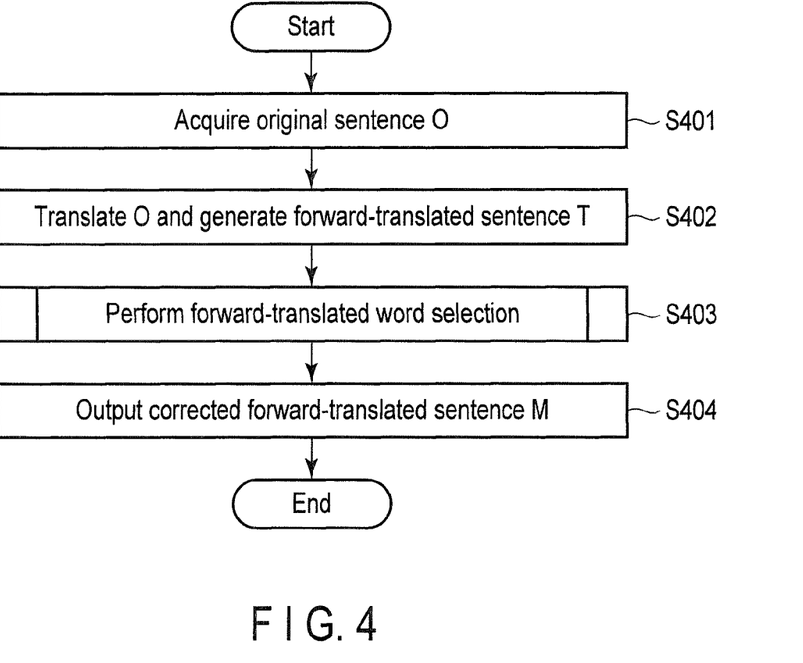
FIG. 4 is an exemplary flowchart illustrating the operation of the machine translation apparatus.

The operation of the machine translation apparatus 100 according to the present embodiment will be explained with reference to the flowchart of FIG. 4.

In step S401, the acquisition unit 101 acquires original sentence O.

In step S402, the translation unit 102 translates the original sentence O into the second language to generate forward-translated sentence T.

In step S403, forward-translated word selection is performed to the forward-translated sentence T. The forward-translated word selection will be explained later with reference to FIG. 5 in detail.

In step S404, the output unit 108 outputs corrected forward-translated sentence M. The operation of the machine translation apparatus 100 is completed by the above process.

Figure 5:
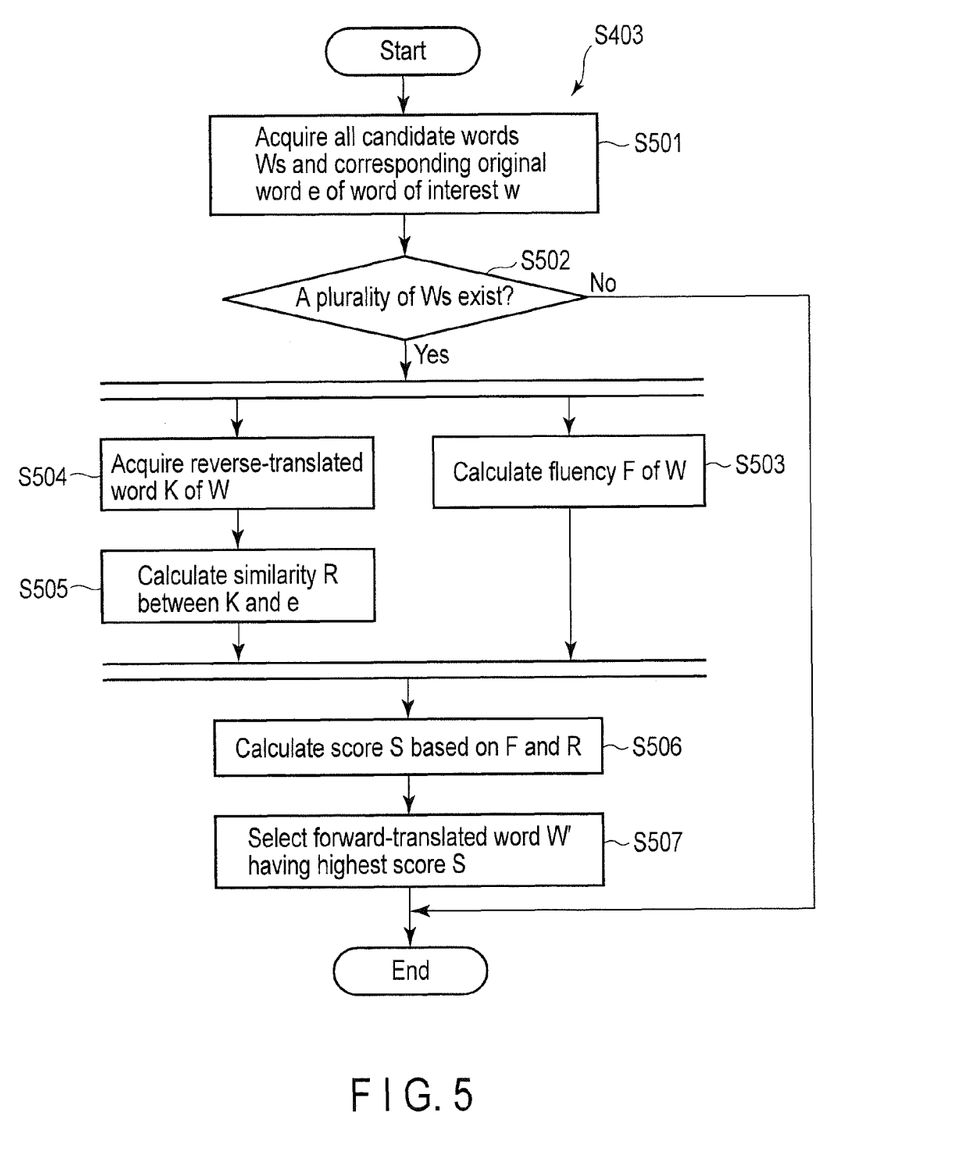
FIG. 5 is an exemplary flowchart illustrating the translation word selection of the machine translation apparatus.

The translated word selection in step S403 will be explained with reference to FIG. 5.

In step S501, the candidate word acquisition unit 103 requests a candidate word W and the corresponding original word e, for a word of interest w at the translation unit 102, and acquires the original word e and all candidate words Ws by referring to the translation dictionary. The word of interest w may be a translated word whose fluency is not more than a threshold. The fluency of each translated word of the forward-translated sentence T is calculated beforehand.

In step S502, the candidate word acquisition unit 103 determines whether more than one candidate words Ws exist. If more than one candidate words Ws exist, steps S503 and 504 are executed, and if only one candidate word W exists, the processing ends.

In step S503, the fluency calculation unit 104 calculates fluency F of each candidate word W.

In step S504, the reverse translation unit 105 acquires at least one reverse-translated word K by reverse-translating each candidate word W.

In step S505, the similarity calculation unit 106 calculates similarity R between the original word e and each of the at least one reverse-translated words Ks.

In step S506, the forward-translated word selection unit 107 calculates a score S based on the fluency F and the similarity R. In this embodiment, the score S is obtained by multiplying the fluency F by the similarity R. However, any calculation can be used for obtaining the score S.

In step S507, the forward-translated word selection unit 107 selects a forward-translated word W' having the highest score S among the candidate words Ws as a corrected forward-translated word. The translated word selection is completed by the above process.

If the forward-translated sentence in which a word of interest has been replaced with a corrected forward-translated word still has a translated word whose fluency is not more than the threshold, steps S501 to S507 may be executed to the translated word. By so doing, the fluency of the whole forward-translated sentence can be increased, and a more natural forward-translated sentence can be obtained.

A detailed example of the operation of translated word selection will be explained with reference to FIGS. 6 to 12.

Figure 6:
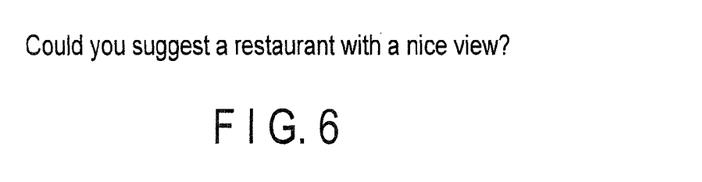
FIG. 6 illustrates an example original sentence acquired at the acquisition unit.

FIG. 6 shows an original sentence acquired by the acquisition unit 101. It is assumed that the original sentence is "Could you suggest a restaurant with a nice view?"

Figure 7:
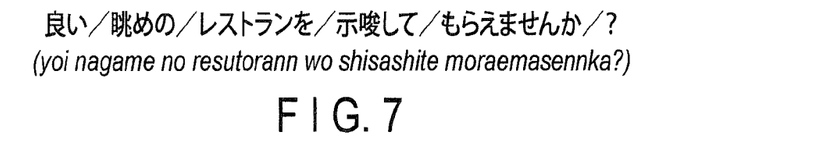
FIG. 7 illustrates an example translation sentence generated at the translation unit.

FIG. 7 shows a forward-translated sentence obtained by translating the original sentence by the translation unit 102. The forward-translated sentence obtained by translating "Could you suggest a restaurant with a nice view?" into the second language is "よい (yoi)/眺めの (nagame no)/レストランを (resutorann wo)/示唆して (shisashite)/もらえませんか (moraemasennka)?" The forward-translated sentence is divided into semantic segments by slashes. A semantic segment is selected as a word of interest.

It is assumed that "示唆して" (shisashite) is selected as a word of interest. The candidate word acquisition unit 103 refers to the translation dictionary database 109 to obtain candidate words, "提案して" (teiannshite) and "勧めて" (susumete), that are the other conversions of the original word "suggest".

Figure 8:
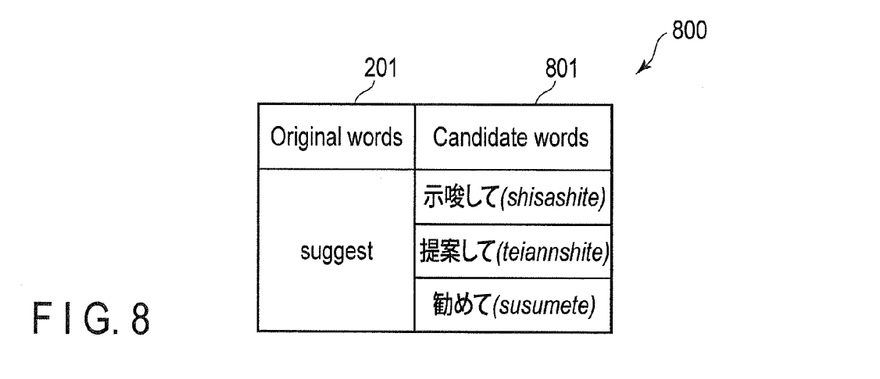
FIG. 8 illustrates an example of the extraction results of candidate words in the candidate word acquisition unit.

FIG. 8 shows extracted candidate words by the candidate word acquisition unit 103.

As shown in table 800 of FIG. 8, three candidate words 801 "示唆して" (shisashite), "提案して" (teiannshite) and "勧めて" (susumete) are obtained for original word 201.

Figure 9:
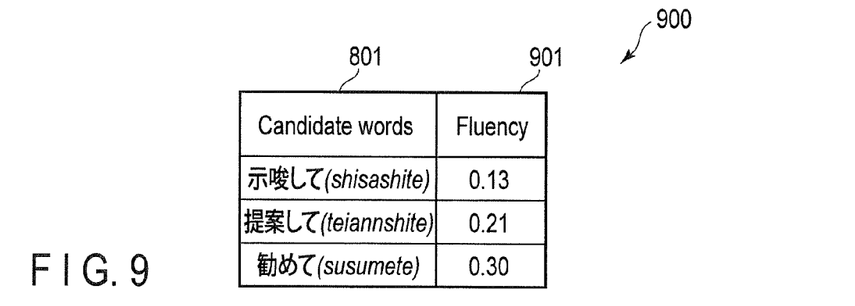
FIG. 9 illustrates an example of the calculation results of fluency according to the first embodiment.

FIG. 9 shows fluencies calculated for three candidate words shown in FIG. 8 by the fluency calculation unit 104.

Table 900 shown in FIG. 9 stores candidate words 801 and fluencies 901 associated with each other. For example, a candidate word 801, "示唆して" (shisashite) is associated with the fluency 901, 0.13. In this embodiment, the fluency stored in the fluency database 110 is used as the fluency of a candidate word; however, the fluency can be obtained, for example, by weighting.

Figure 10:
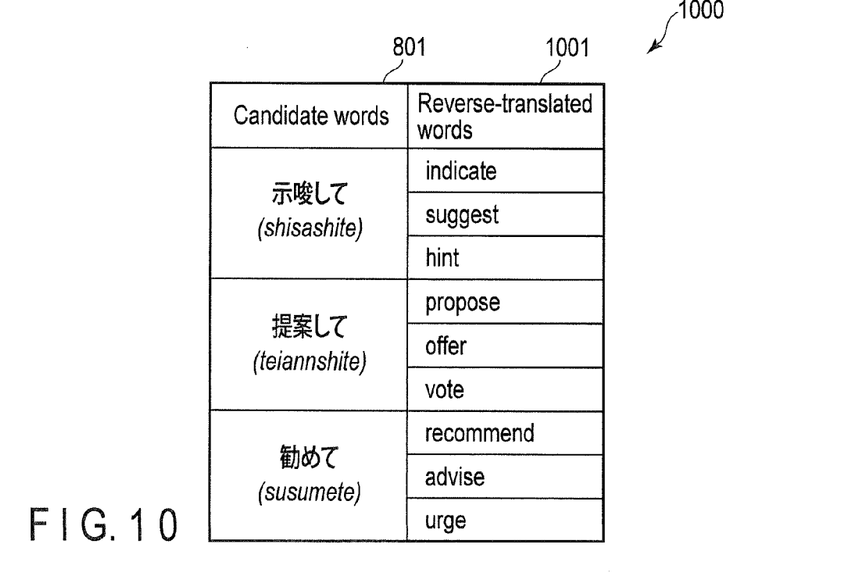
FIG. 10 illustrates an example of the reverse translation results according to the first embodiment.

FIG. 10 shows the results of reverse-translating candidate words into the first language by the reverse translation unit 105.

Table 1000 shown in FIG. 10 stores candidate words 801 and reverse-translated words 1001 associated with each other. For example, reverse-translated words 1001, "indicate," "suggest" and "hint," are associated with a candidate word 801, "示唆して" (shisashite). In this embodiment, three reverse-translated words 1001 (first language) are obtained for each candidate word 801; however, any number of reverse-translated words can be stored.

Figure 11:
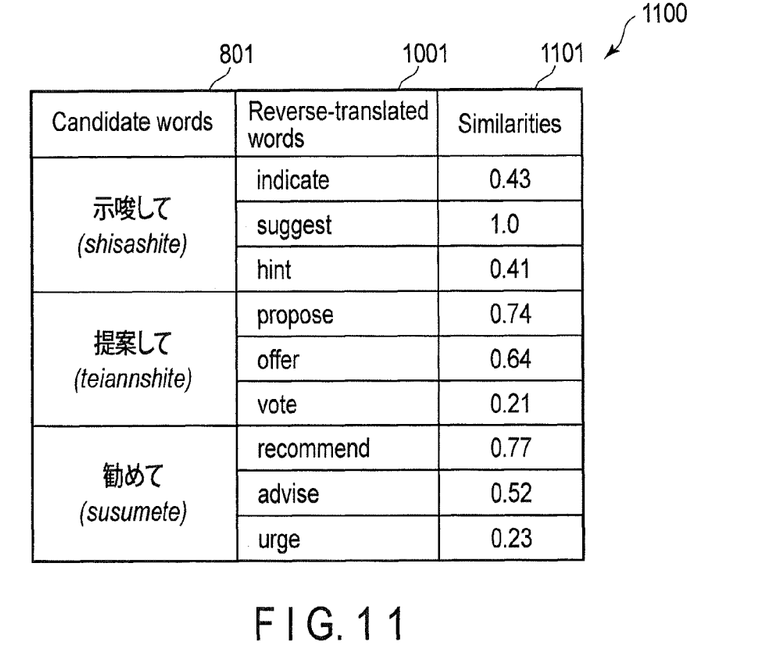
FIG. 11 illustrates an example of the calculation results of similarity according to the first embodiment.

FIG. 11 shows the results of calculating the similarity between an original word "suggest" and each reverse-translated word by the similarity calculation unit 106.

Table 1100 shown in FIG. 11 stores candidate words 801, reverse-translated words 1001 and similarities 1101 associated with each other. For example, a candidate word 801 "示唆して" (shisashite) is associated with reverse-translated words 1001 "indicate," "suggest" and "hit," and the reverse-translated words 1001 "indicate," "suggest" and "hit" are associated with the similarities 1101 "0.43", "1.0" and "0.41", respectively. Since the reverse-translated word "suggest" is the same as the original word "suggest," the similarity is "1.0".

The similarity is obtained by calculating the scales such as TF-IDF from a text corpus set, generating a word vector as indicated as equation (1) by arranging the scales in a predetermined order, and calculating a cosine similarity of the generated word vector, for example.

$$\vec{w} = (w_1 w_2 w_3, \ldots) \quad (1)$$

For example, the similarity of an original word "suggest" and a reverse-translated word "indicate" can be obtained by $$sim(a, b) = \frac{\vec{a} \cdot \vec{b}}{|\vec{a}| \cdot |\vec{b}|}, \quad (2)$$

where a is "suggest" and b is "indicate."

Figure 12:
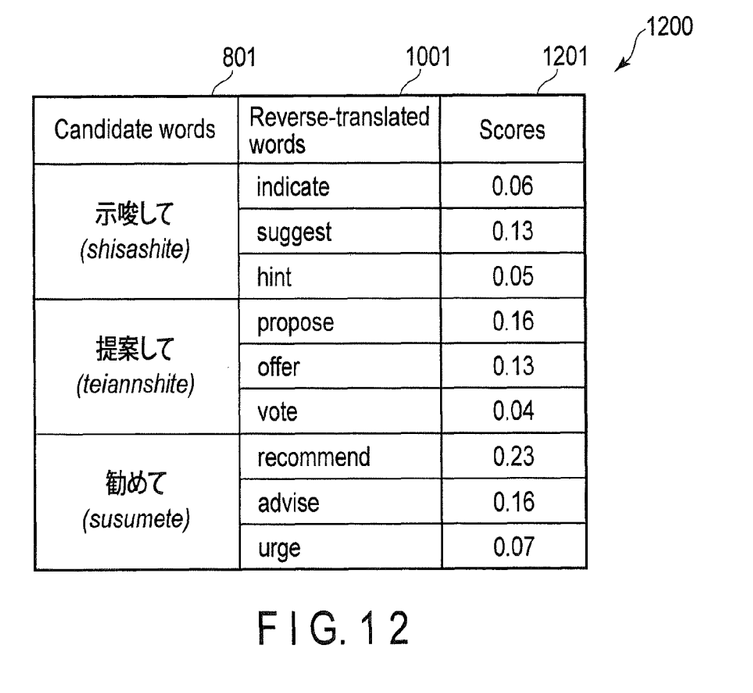
FIG. 12 illustrates an example of the scores according to the first embodiment.

FIG. 12 shows the results of the score calculated by the forward-translated word selection unit 107.

Table 1200 shown in FIG. 12 stores the candidate words 801 and the reverse-translated words 1001 shown in FIG. 11 and the corresponding determined scores 1201 that are associated with each other.

The forward-translated word selection unit 107 selects "勧めて" (susumete) as a corrected forward-translated word since the score 1201 0.23 of the reverse-translated word 1001 "recommend" is the highest. Accordingly, the word of interest "示唆して" (shisashite) in the forward-translated sentence "よい眺めのレストランを示唆してもらえませんか?" will be replaced with "勧めて" (susumete).

Then, the output unit 108 outputs "よい眺めのレストランを勧めてもらえませんか" (yoi nagame no resutorann wo susumete moraemasennka) as a corrected forward-translated sentence.

According to the first embodiment, when machine-translating an original sentence of the first language into the second language, the fluency of a word of interest in a forward-translated sentence is calculated, the similarity between an original word corresponding to the word of interest and each of reverse-translated words of the word of interest is calculated, and the most suitable translated word is selected based on the scores of reverse-translated words computed based on the fluency and similarity.

Accordingly, a forward-translated sentence which satisfies fluency and accuracy can be generated.

Second Embodiment

In the first embodiment, candidate words are included in the translation dictionary, while in the second embodiment, candidate words are also obtained from a fluency database. By using the fluency database, the candidate words are selected in consideration of fluency, and a more natural forward-translated sentence can be generated.

Figure 13:
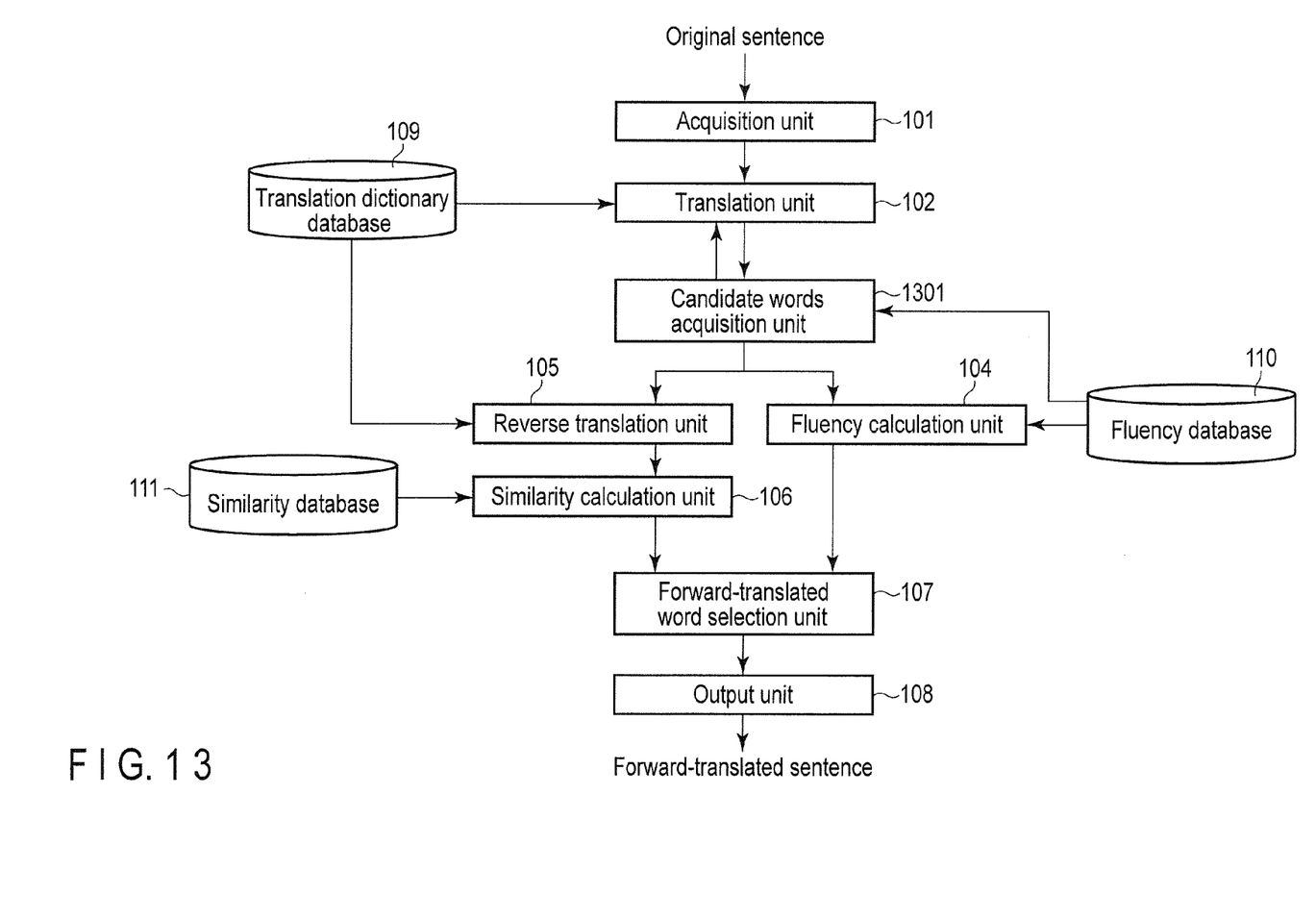
FIG. 13 is an exemplary block diagram illustrating a machine translation apparatus according to the second embodiment.

A description of the machine translation apparatus according to the second embodiment with reference to the block diagram shown in FIG. 13 follows.

A machine translation apparatus 1300 according to the second embodiment includes an acquisition unit 101, a translation unit 102, a candidate word acquisition unit 1301, a fluency calculation unit 104, a reverse translation unit 105, a similarity calculation unit 106, a forward-translated word selection unit 107, an output unit 108, a translation dictionary database 109, a fluency database 110 and similarity database 111.

The acquisition unit 101, translation unit 102, a fluency calculation unit 104, reverse translation unit 105, similarity calculation unit 106, forward-translated word selection unit 107, output unit 108, translation dictionary database 109, a fluency database 110 and similarity database 111 carry out the same operation as described in the first embodiment. Accordingly, the explanations of the operation will be omitted.

The candidate word acquisition unit 1301 performs substantially similar operation to that of the candidate word acquisition unit 103 in the first embodiment. However, the candidate word acquisition unit 1301 adds a translated word obtained from the fluency database 110 to the candidate words. For example, a predetermined number of candidate words with the highest fluency when inserted between the preceding word and the subsequent word are selected from the fluency database 110.

A specific example of the operation of the candidate word acquisition unit 1301 in accordance with the second embodiment will be explained with reference to FIGS. 3, 14 and 17.

The candidate word acquisition unit 1301 extracts forward-translated words with the highest fluency from the fluency database 110 in addition to the forward-translated words obtained from the translation dictionary database 109. In this example, three forward-translated words with the highest fluency, "探して" (sagashite: fluency 0.84), "教えて" (oshiete: fluency 0.73) and "経営して" (keieishite: fluency 0.64) are selected from table 300 shown in FIG. 3.

Figure 14:
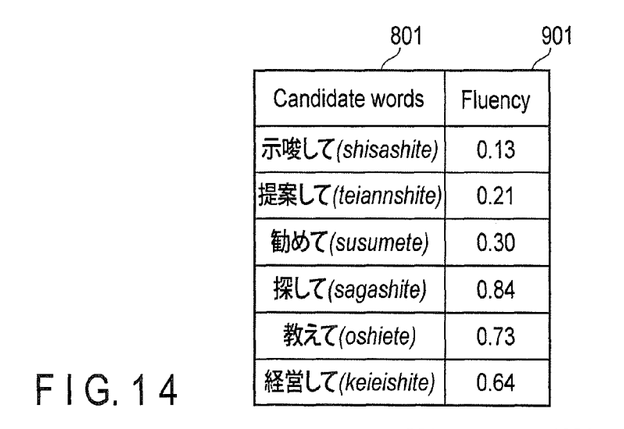
FIG. 14 illustrates an example of the calculation results of fluency according to the second embodiment.

FIG. 14 shows the calculation results of fluencies of candidate words in the fluency calculation unit 104. As shown in FIG. 14, the fluencies of the three candidate word newly obtained from the fluency database 110 are calculated.

Figure 15:
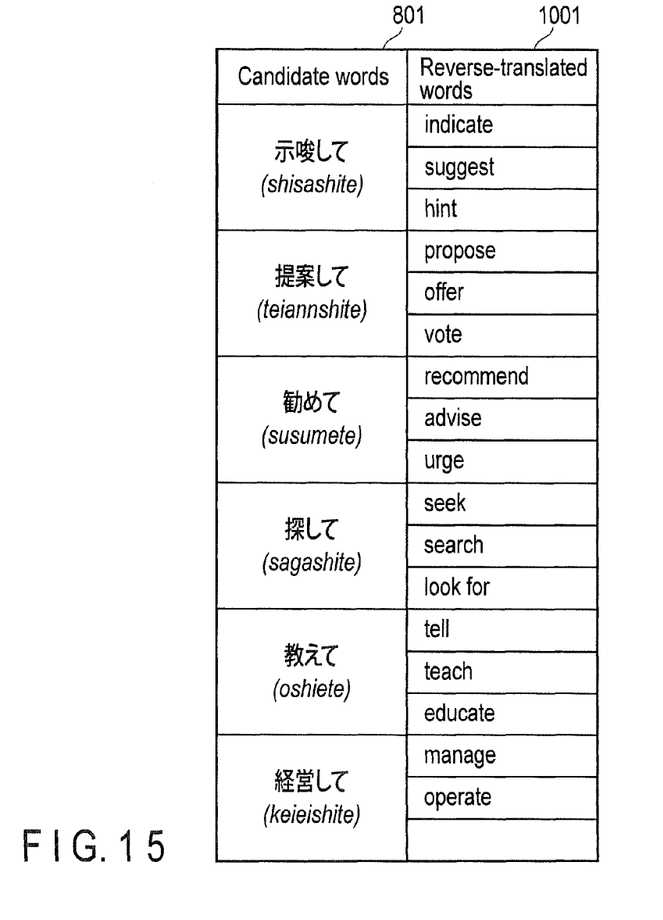
FIG. 15 illustrates an example of the reverse translation results according to the second embodiment.

FIG. 15 shows a table indicating the results of reverse-translation of the six candidate words in the reverse translation unit 105.

For example, the reverse translation unit 105 reverse-translates a newly obtained candidate word "探して" (sagashite) and obtains "seek," "search" and "look for" as the results of reverse translation.

Figure 16:
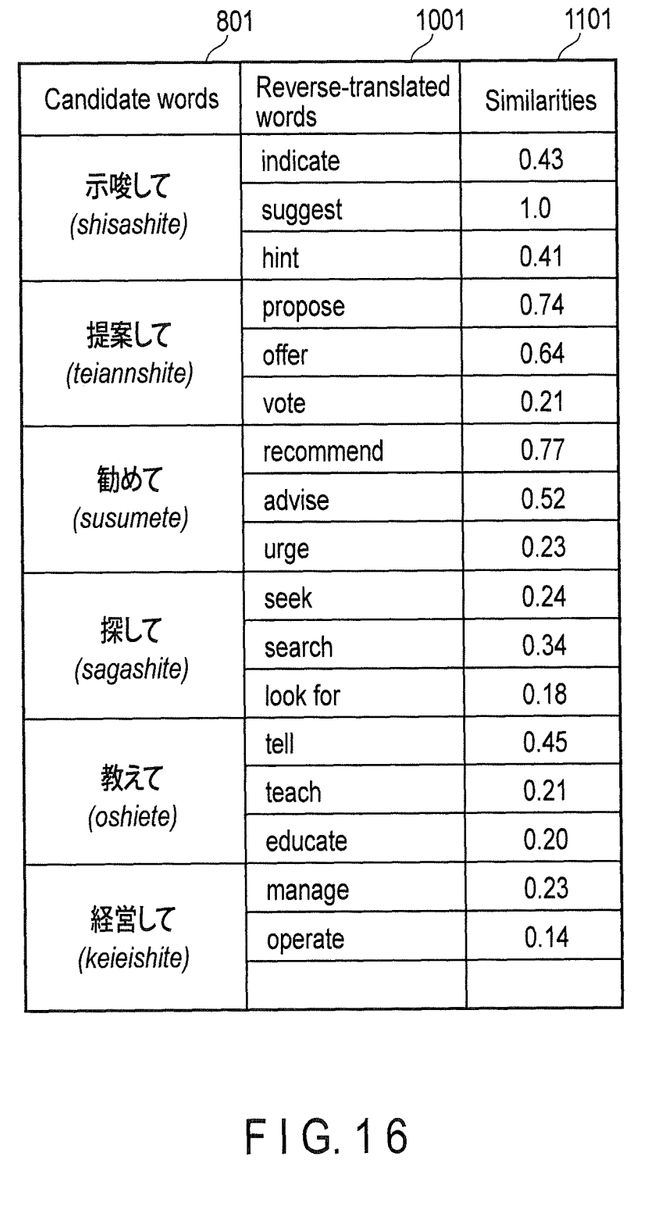
FIG. 16 illustrates an example of the calculation results of similarity according to the second embodiment.

FIG. 16 shows a table indicating the calculation results of similarity in the similarity calculation unit 106.

The similarity between the original word "suggest" and each of the reverse-translated words is obtained. The candidate words obtained from the fluency database 110 are selected based on the fluency of the forward-translated sentence. Accordingly, the similarity of candidate words obtained from the fluency database 110 tends to be smaller than that of candidate words obtained from the translation dictionary.

Figure 17:
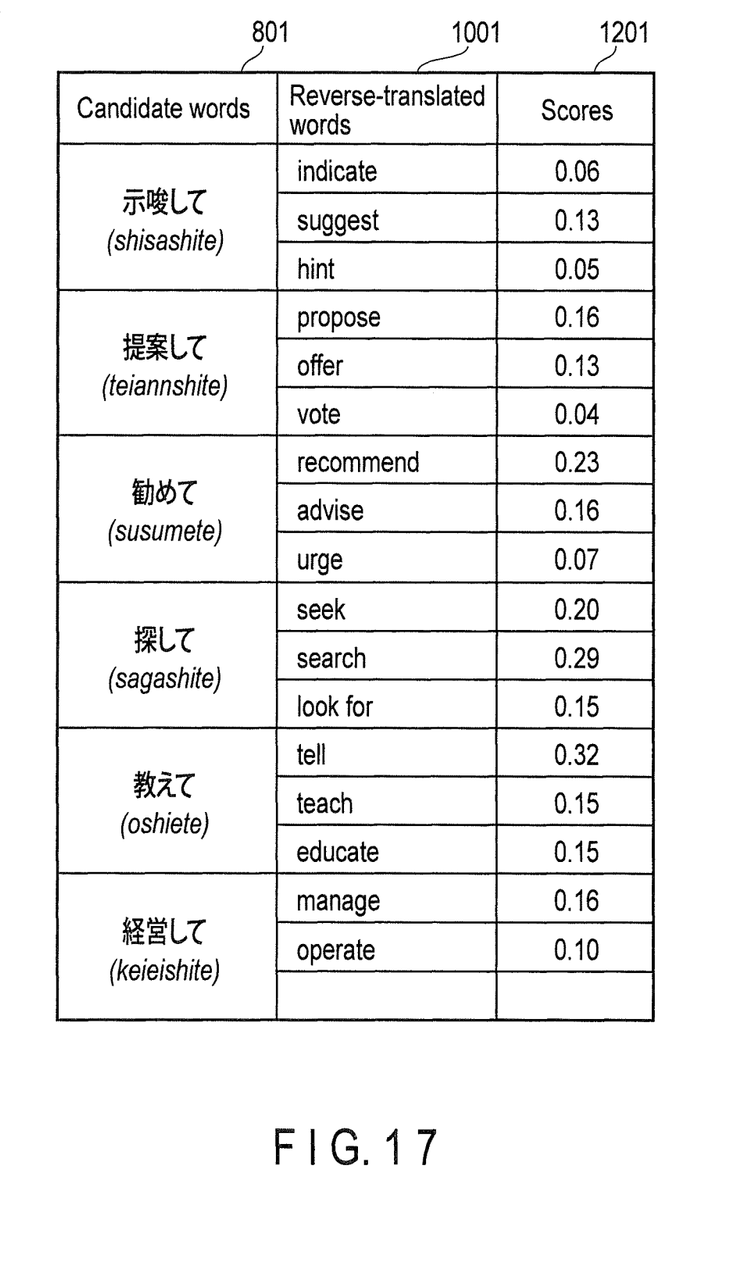
FIG. 17 illustrates an example of the scores according to the second embodiment.

FIG. 17 shows the results of calculating the scores in the forward-translated word selection unit 107.

The scores can be calculated in the same manner as described in the first embodiment. In this example, the score of the reverse-translated word "tell" corresponding to the candidate word 801 "教えて" (oshiete) is 0.32 which is the highest. Accordingly, the candidate word 801 "教えて" (oshiete) is selected as a corrected forward-translated word, and the word of interest "示唆して" (shisashite) is replaced with "教えて" (oshiete).

According to the second embodiment, candidate words are added based on the fluency of a forward-translated sentence from the fluency database, thereby generating a forward-translated sentence with higher fluency while satisfying accuracy between the original sentence and the forward-translated sentence.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A machine translation apparatus comprising:
    a translation unit configured to translate an original sentence which is a character string of a first language into a forward-translated sentence which is a character string of a second language;
    an acquisition unit configured to acquire, by translating an original word in the original sentence corresponding to a first forward-translated word in the forward-translated sentence, at least one second forward-translated word different from the first forward-translated word, to obtain candidate words including the first forward-translated word and the at least one second forward-translated word;
    a first calculation unit configured to calculate a fluency for each of the candidate words, the fluency indicating naturalness of the forward-translated sentence if each of the candidate words is replaced with the first forward-translated word;
    a reverse translation unit configured to obtain at least one reverse-translated word for each of the candidate words by reverse-translating each candidate word into the first language;
    a second calculation unit configured to calculate a semantic similarity between the original word and each reverse-translated word; and
    a selection unit configured to select a corrected forward-translated word to be replaced with the first forward-translated word from among the candidate words based on the semantic similarity and fluency.

2. The apparatus according to claim 1, wherein the acquisition unit adds, a word of the second language having the fluency not less than a threshold when being replaced with the first forward-translated word, as a new candidate word.

3. The apparatus according to claim 1, wherein the first calculation unit calculates the fluency by using N-gram language model.

4. The apparatus according to claim 1, wherein the reverse translation unit extracts at least one word of the first language obtained by translating each candidate words as the at least one reverse-translated word.

5. The apparatus according to claim 1, wherein the reverse translation unit acquires, from external device, at least one word obtained by translating each of the candidate words into the first language and adds the acquired the at least one word as the reverse-translated words.

6. A machine translation method comprising:
    translating an original sentence which is a character string of a first language into a forward-translated sentence which is a character string of a second language;
    acquiring, by translating an original word in the original sentence corresponding to a first forward-translated word in the forward-translated sentence, at least one second forward-translated word different from the first forward-translated word, to obtain candidate words including the first forward-translated word and the at least one second forward-translated word;
    calculating a fluency for each of the candidate words, the fluency indicating naturalness of the forward-translated sentence if each of the candidate words is replaced with the first forward-translated word;
    obtaining at least one reverse-translated word for each of the candidate words by reverse-translating each candidate word into the first language;
    calculating a semantic similarity between the original word and each reverse-translated word; and
    selecting a corrected forward-translated word to be replaced with the first forward-translated word from among the candidate words based on the semantic similarity and fluency.

7. The method according to claim 6, wherein the acquiring the at least one second forward-translated word adds, a word of the second language having the fluency not less than a threshold when being replaced with the first forward-translated word, as a new candidate word.

8. The method according to claim 6, wherein the calculating the fluency calculates the fluency by using N-gram language model.

9. The method according to claim 6, wherein the obtaining the at least one reverse-translated word extracts at least one word of the first language obtained by translating each candidate words as the at least one reverse-translated word.

10. The method according to claim 6, wherein the obtaining the at least one reverse-translated word acquires, from external device, at least one word obtained by translating each of the candidate words into the first language and adds the acquired the at least one word as the reverse-translated words.

11. A non-transitory computer readable medium including computer executable instructions, wherein the instructions, when executed by a processor, cause the processor to perform a method comprising:
    translating an original sentence which is a character string of a first language into a forward-translated sentence which is a character string of a second language;
    acquiring, by translating an original word in the original sentence corresponding to a first forward-translated word in the forward-translated sentence, at least one second forward-translated word different from the first forward-translated word, to obtain candidate words including the first forward-translated word and the at least one second forward-translated word;
    calculating a fluency for each of the candidate words, the fluency indicating naturalness of the forward-translated sentence if each of the candidate words is replaced with the first forward-translated word;
    obtaining at least one reverse-translated word for each of the candidate words by reverse-translating each candidate word into the first language;
    calculating a semantic similarity between the original word and each reverse-translated word; and
    selecting a corrected forward-translated word to be replaced with the first forward-translated word from among the candidate words based on the semantic similarity and fluency.

12. The medium according to claim 11, wherein the acquiring the at least one second forward-translated word adds, a word of the second language having the fluency not less than a threshold when being replaced with the first forward-translated word, as a new candidate word.

13. The medium according to claim 11, wherein the calculating the fluency calculates the fluency by using N-gram language model.

14. The medium according to claim 11, wherein the obtaining the at least one reverse-translated word extracts at least one word of the first language obtained by translating each candidate words as the at least one reverse-translated word.

15. The medium according to claim 11, wherein the obtaining the at least one reverse-translated word acquires, from external device, at least one word obtained by translating each of the candidate words into the first language and adds the acquired the at least one word as the reverse-translated words.

\* \* \* \* \*